(12) United States Patent
Yang

(10) Patent No.: US 11,371,412 B2
(45) Date of Patent: Jun. 28, 2022

(54) EXHAUST HEAT RECOVERY APPARATUS FOR VEHICLE HAVING A LONGITUDINAL VALVE SEPARATING TWO PARALLEL EXHAUST FLOW PATHS

(71) Applicants: Hyundai Motor Company, Seoul (KR); Kia Motors Corporation, Seoul (KR)

(72) Inventor: Young Dug Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/953,501

(22) Filed: Nov. 20, 2020

(65) Prior Publication Data
US 2022/0010715 A1 Jan. 13, 2022

(30) Foreign Application Priority Data
Jul. 9, 2020 (KR) .................. 10-2020-0084882

(51) Int. Cl.
*F01N 5/02* (2006.01)
*F01N 13/08* (2010.01)
*F01N 1/16* (2006.01)

(52) U.S. Cl.
CPC .............. *F01N 5/02* (2013.01); *F01N 1/166* (2013.01); *F01N 13/08* (2013.01); *F01N 13/087* (2013.01); *F01N 2240/02* (2013.01); *F01N 2240/20* (2013.01); *F01N 2410/02* (2013.01)

(58) Field of Classification Search
CPC ............. F01N 2410/00; F01N 2410/02; F01N 2240/20; F01N 2240/36; F01N 5/02; F01N 1/166; F01N 13/017; F01N 13/087; F01N 3/0335; F01N 3/2885; F01N 3/2889
See application file for complete search history.

(56) References Cited

U.S. PATENT DOCUMENTS

| | | | | |
|---|---|---|---|---|
| 6,330,910 B1 * | 12/2001 | Bennett | ................... | F28F 27/02 165/297 |
| 2005/0247051 A1 * | 11/2005 | Wagner | ................. | F01N 13/017 60/287 |
| 2011/0041482 A1 * | 2/2011 | Cheng | ................... | F01N 3/2053 60/288 |
| 2012/0017575 A1 * | 1/2012 | Sloss | ....................... | F28F 27/02 60/320 |
| 2015/0167519 A1 * | 6/2015 | Gerges | ................. | F01N 3/0205 165/104.19 |
| 2016/0376970 A1 * | 12/2016 | Murata | ..................... | F01N 5/02 60/320 |
| 2018/0087428 A1 * | 3/2018 | Barr | ...................... | F01N 11/002 |

* cited by examiner

*Primary Examiner* — Laert Dounis
(74) *Attorney, Agent, or Firm* — Fox Rothschild LLP

(57) ABSTRACT

An exhaust heat recovery apparatus includes: a housing having a first exhaust passage and a second exhaust passage, an exhaust inlet fitting, and an exhaust outlet fitting; a heat exchanger disposed in the first exhaust passage; and a switching valve having a slide gate which is movable in a longitudinal direction of the housing so as to allow a flow of exhaust gases to be switched between the first exhaust passage and the second exhaust passage, wherein the first exhaust passage is parallel to the second exhaust passage, and the slide gate is movable between the first exhaust passage and the second exhaust passage.

10 Claims, 12 Drawing Sheets

EXHAUST HEAT RECOVERY APPARATUS FOR VEHICLE HAVING A LONGITUDINAL VALVE SEPARATING TWO PARALLEL EXHAUST FLOW PATHS

CROSS-REFERENCE TO RELATED APPLICATION

This application claims under 35 U.S.C. § 119(a) the benefit of Korean Patent Application No. 10-2020-0084882, filed on Jul. 9, 2020 in the Korean Intellectual Property Office, the entire contents of which are incorporated by reference herein.

BACKGROUND

(a) Technical Field

The present disclosure relates to an exhaust heat recovery apparatus, more particularly, to the exhaust heat recovery apparatus for a vehicle capable of improving ease of assembly (i.e., mounting) by reducing its volume and weight.

(b) Description of the Related Art

As is well-known in the art, a vehicle includes an exhaust heat recovery apparatus to recover the heat of exhaust gases. The exhaust heat recovery apparatus is designed to recover heat or thermal energy from the exhaust gases discharged through an exhaust system for various purposes.

For example, the recovered heat energy may be used to heat a cooling fluid that provides engine warm-up, passenger compartment warm-up, and/or windshield defrosting. In addition, the recovered heat energy may be used to improve fuel efficiency by reducing friction and viscous losses in a vehicle lubrication system.

The exhaust heat recovery apparatus may include a housing having a first exhaust passage and a second exhaust passage, and a switching valve allowing the flow of the exhaust gases to be switched between the first exhaust passage and the second exhaust passage. A heat exchanger may be disposed within the first exhaust passage, and the first exhaust passage may be a path of the exhaust gas that bypasses the heat exchanger.

The heat exchanger may include a cooling fluid channel through which a coolant or the like passes, and an exhaust gas channel through which the exhaust gas passes. The switching valve may be configured to switch the flow of the exhaust gas between the first exhaust passage and the second exhaust passage according to a temperature of the cooling fluid heated by the heat exchanger.

In a conventional exhaust heat recovery apparatus, however, the switching valve is disposed adjacent to one end portion of the housing, and has a disc-type or flap-type valve member, resulting in a relatively increased size and weight of the exhaust heat recovery apparatus. Accordingly, when the exhaust heat recovery apparatus is mounted in the vehicle, it may interfere with other peripheral components. As a result, the mounting and layout of the exhaust heat recovery apparatus may be limited.

The above information described in this background section is provided to assist in understanding the background of the inventive concept, and may include any technical concept which is not considered as the prior art that is already known to those skilled in the art.

SUMMARY

An aspect of the present disclosure provides an exhaust heat recovery apparatus which is designed to switch the flow of exhaust gases between a first exhaust passage and a second exhaust passage by movement of a slide gate, thereby reducing volume and weight of the apparatus, and thus improving ease of assembly (i.e., mounting).

According to an aspect of the present disclosure, an exhaust heat recovery apparatus may include: a housing having a first exhaust passage and a second exhaust passage, an exhaust inlet fitting, and an exhaust outlet fitting; a heat exchanger disposed in the first exhaust passage; and a switching valve having a slide gate which is movable in a longitudinal direction of the housing so as to allow a flow of exhaust gases to be switched between the first exhaust passage and the second exhaust passage. The first exhaust passage may be parallel to the second exhaust passage, and the slide gate may be movable between the first exhaust passage and the second exhaust passage.

The slide gate may be disposed to divide the first exhaust passage and the second exhaust passage within the housing.

The first exhaust passage may have a first inlet communicating with the exhaust inlet fitting, and a first outlet communicating with the exhaust outlet fitting, and the second exhaust passage may have a second inlet communicating with the exhaust inlet fitting and a second outlet communicating with the exhaust outlet fitting.

The first inlet may directly communicate with the exhaust inlet fitting the second inlet may selectively communicate with the first inlet by movement of the slide gate, the second outlet may directly communicate with the exhaust outlet fitting and the first outlet may selectively communicate with the second outlet by the movement of the slide gate.

The slide gate may move between a first position and a second position, the first position may refer to a position in which the slide gate blocks the second inlet, and the second position may refer to a position in which the slide gate blocks the first outlet.

The heat exchanger may include a tube bundle having a plurality of flat tubes, and the tube bundle may include a cooling fluid channel defined inside each of the flat tubes, and an exhaust gas channel defined between adjacent ones of the flat tubes.

The heat exchanger may have a cooling fluid inlet fitting and a cooling fluid outlet fitting communicating with the cooling fluid channel.

The switching valve may include a drive mechanism by which the slide gate is driven The drive mechanism may include a shaft, a driving gear fixed to a middle portion of the shaft, a cam member fixed to an end portion of the shaft, and a wax actuator selectively rotating the cam member, and the driving gear may be operatively connected to the slide gate to linearly move the slide gate.

The driving gear may have teeth arranged on an outer circumferential surface of the driving gear, the slide gate may have rack teeth arranged in a longitudinal direction of the slide gate, and the teeth of the driving gear may mesh with the rack teeth of the slide gate.

The cam member may rotate between a first rotation position in which the slide gate is moved to a first position and a second rotation position in which the slide gate is moved to a second position.

The wax actuator may be thermally connected to the cooling fluid outlet fitting, and the wax actuator may include a wax material which expands or contracts depending on a temperature of a cooling fluid passing through the cooling fluid outlet fitting, and an operating rod which advances and retracts by expansion and contraction of the wax material.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
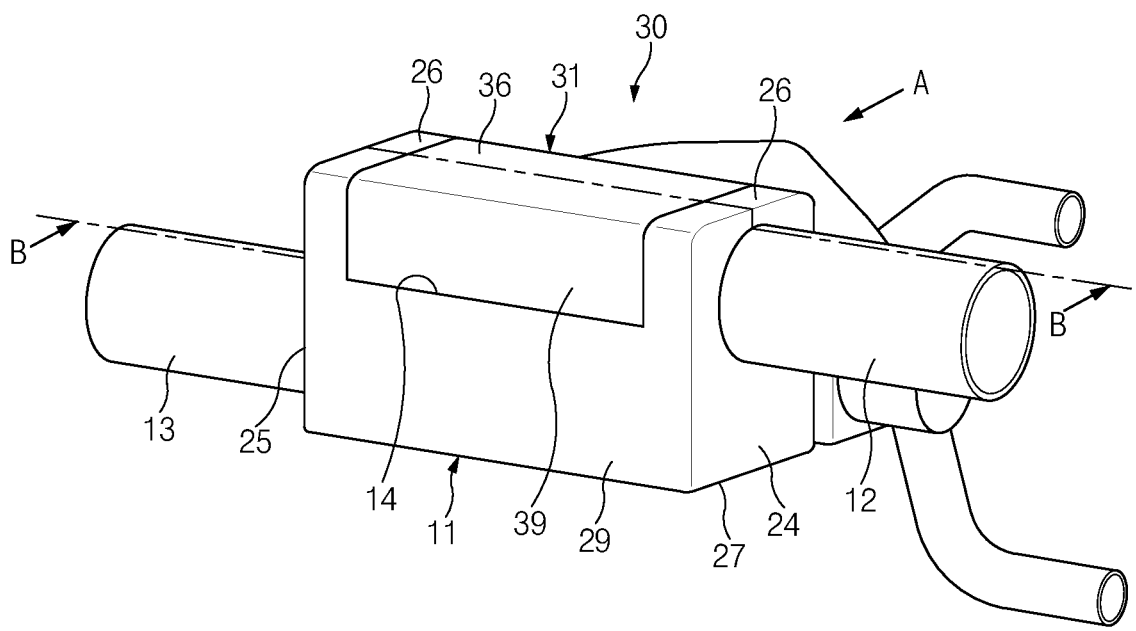
FIG. 1 illustrates a perspective view of an exhaust heat recovery apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIGS. 1 to 5, an exhaust heat recovery apparatus 10 according to an exemplary embodiment of the present disclosure may include a housing 11 having a first exhaust passage 21 and a second exhaust passage 22, a heat exchanger 30 disposed in the first exhaust passage 21, and a switching valve 40 having a slide gate 41 which is movable in a longitudinal direction of the housing 11 so as to allow a flow of exhaust gases to be switched between the first exhaust passage 21 and the second exhaust passage 22.

The housing 11 may include an inlet-side wall 24, an outlet-side wall 25, a top wall 26 facing the top of the housing 11, a bottom wall 27 facing the bottom of the housing 11, and a pair of sidewalls 28 and 29 facing left and right sides of the housing 11. The inlet-side wall 24 may oppose the outlet-side wall 25 in a direction of the flow of the exhaust gas.

The housing 11 may have an exhaust inlet fitting 12 allowing inflow of the exhaust gas, and an exhaust outlet fitting 13 allowing discharge of the exhaust gas. The first exhaust passage 21 may be parallel to the second exhaust passage 22.

The exhaust inlet fitting 12 may extend from the inlet-side wall 24, and the exhaust outlet fitting 13 may extend from the outlet-side wall 25. As the inlet-side wall 24 opposes the outlet-side wall 25, the exhaust inlet fitting 12 may oppose the exhaust outlet fitting 13.

Figure 3:
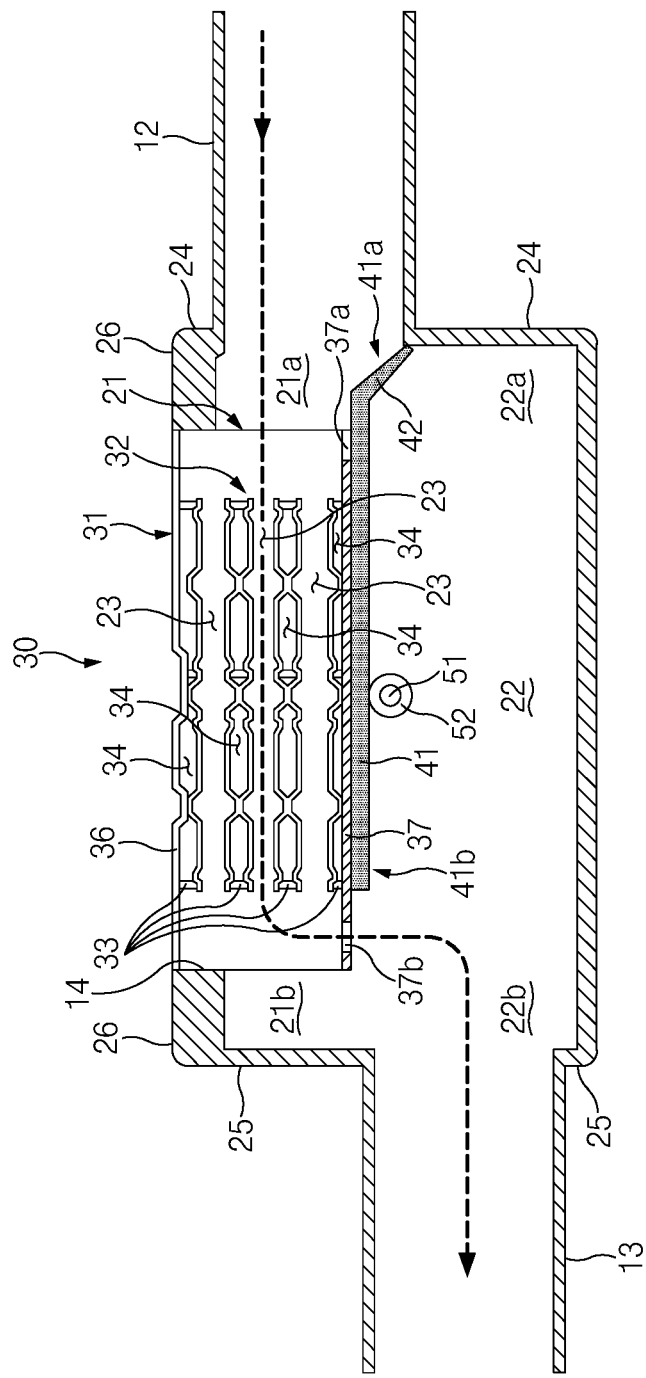
FIG. 3 illustrates a cross-sectional view of a state in which a slide gate is in a first position, taken along line B-B of FIG. 1.
Figure 4:
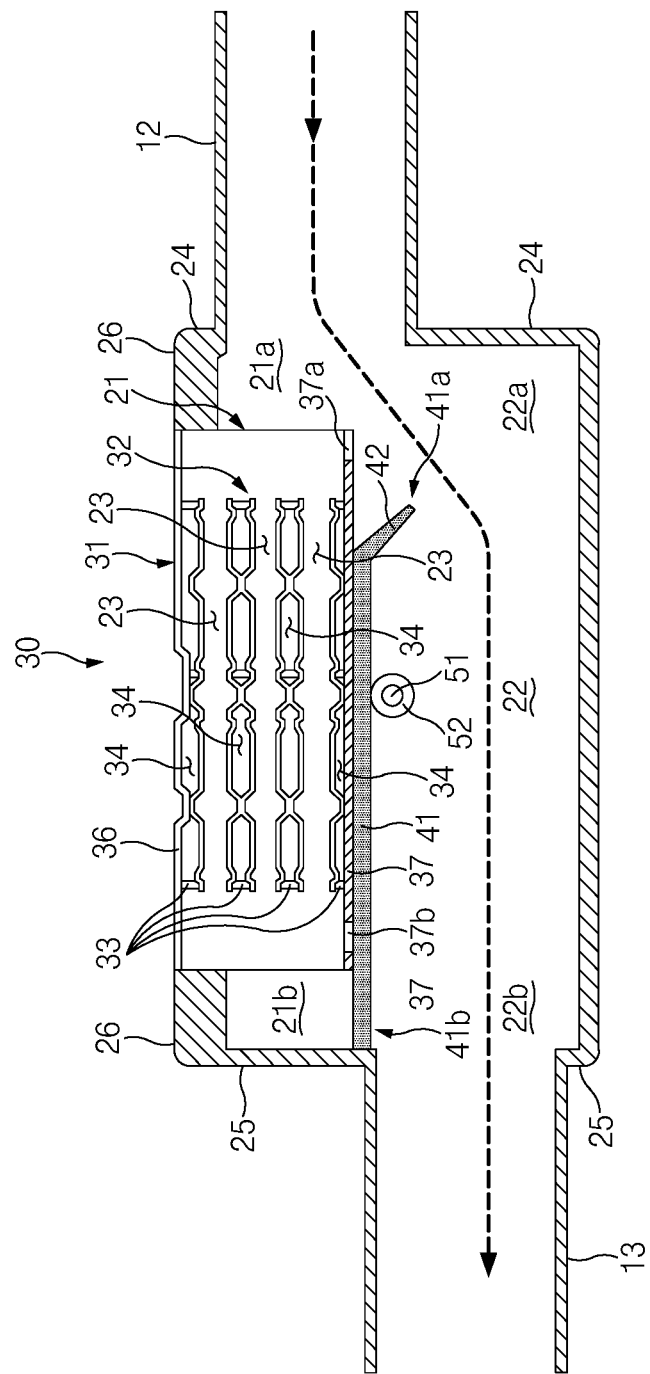
FIG. 4 illustrates a cross-sectional view of a state in which the slide gate illustrated in FIG. 3 is switched to a second position.

Referring to FIGS. 3 and 4, the first exhaust passage 21 and the second exhaust passage 22 may be defined inside the housing 11, and the first exhaust passage 21 may be located above the second exhaust passage 22. The first exhaust passage 21 may have a first inlet 21a communicating with the exhaust inlet fitting 12, and a first outlet 21b communicating with the exhaust outlet fitting 13. The first exhaust passage 21 may be defined by the top wall 26, the inlet-side wall 24, the outlet-side wall 25, the pair of sidewalls 28 and 29, and the slide gate 41. That is, the first exhaust passage 21 may be defined in an upper space adjacent to the top wall 26 inside the housing 11. The second exhaust passage 22 may have a second inlet 22a communicating with the exhaust inlet fitting 12 and a second outlet 22b communicating with the exhaust outlet fitting 13. The second exhaust passage 22 may be defined by the slide gate 41, the inlet-side wall 24, the outlet-side wall 25, the pair of sidewalls 28 and 29, and the bottom wall 27. That is, the second exhaust passage 22 may be defined in a lower space adjacent to the bottom wall 27 inside the housing 11. A longitudinal axis of the exhaust inlet fitting 12 may be aligned with a longitudinal axis of the first exhaust passage 21, and a longitudinal axis of the exhaust outlet fitting 13 may be aligned with a longitudinal axis of the second exhaust passage 22. Thus, the longitudinal axis of the exhaust inlet fitting 12 may be spaced apart from the longitudinal axis of the exhaust outlet fitting 13 in a height direction of the housing 11.

Referring to FIGS. 3 and 4, the first exhaust passage 21 and the second exhaust passage 22 may be divided by the slide gate 41 of the switching valve 40. As the first inlet 21a of the first exhaust passage 21 is aligned with the exhaust inlet fitting 12, the first inlet 21a of the first exhaust passage 21 may directly communicate with the exhaust inlet fitting 12, and the second inlet 22a of the second exhaust passage 22 may selectively communicate with the first inlet 21a of the first exhaust passage 21 by movement of the slide gate 41. As the second outlet 22b of the second exhaust passage 22 is aligned with the exhaust outlet fitting 13, the second outlet 22b of the second exhaust passage 22 may directly communicate with the exhaust outlet fitting 13, and the second outlet 22b of the second exhaust passage 22 may selectively communicate with the first outlet 21b of the first exhaust passage 21 by the movement of the slide gate 41.

Figure 5:
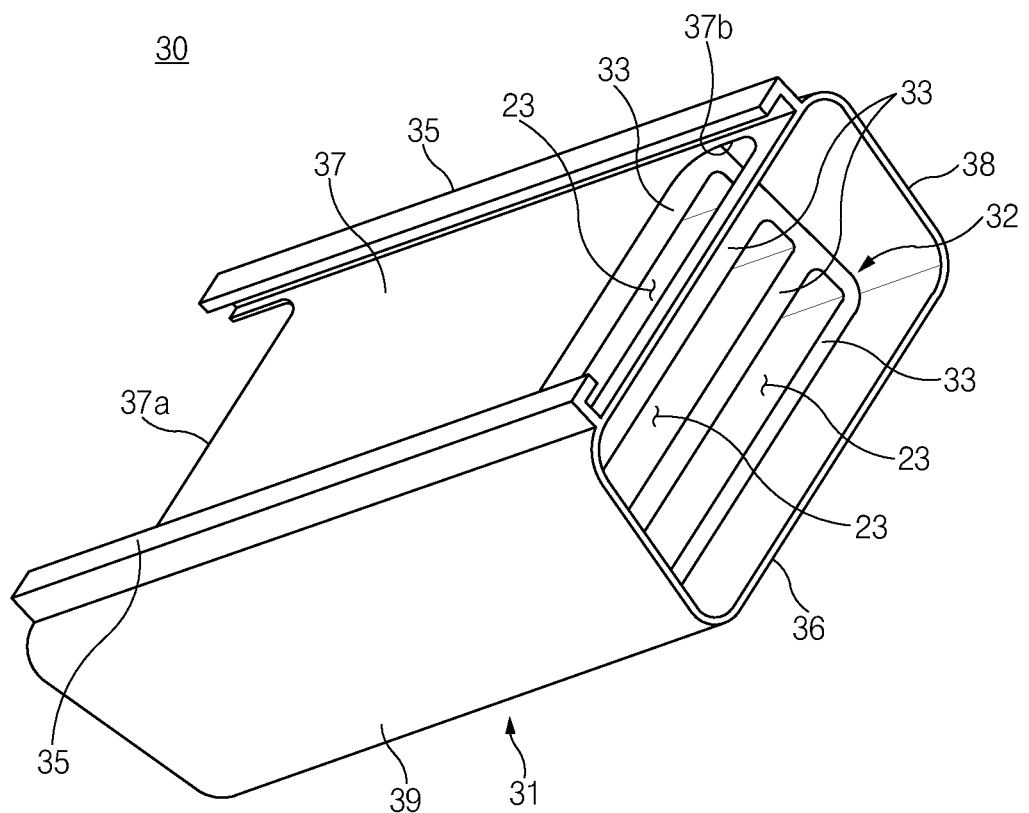
FIG. 5 illustrates a perspective view of a heat exchanger in an exhaust heat recovery apparatus according to an exemplary embodiment of the present disclosure.
Figure 6:
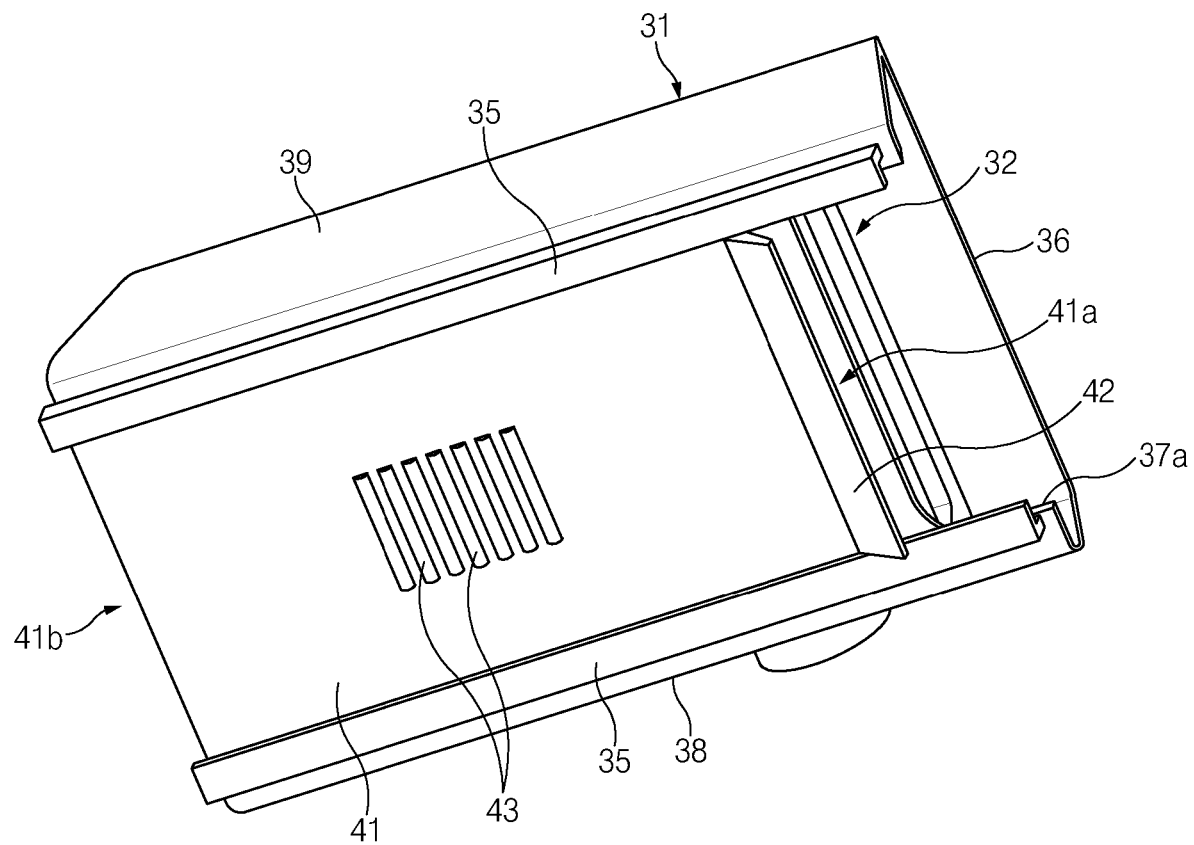
FIG. 6 illustrates a perspective view of a heat exchanger and a slide gate mounted in the heat exchanger in an exhaust heat recovery apparatus according to an exemplary embodiment of the present disclosure.

Referring to FIGS. 3 to 5, the heat exchanger 30 may include a case 31 and a tube bundle 32 mounted in the case 31. The tube bundle 32 may include a plurality of flat tubes 33 arranged with a predetermined gap therebetween in a vertical direction inside the case 31. The tube bundle 32 may include a cooling fluid channel 34 defined inside each of the flat tubes 33 and an exhaust gas channel 23 defined between the adjacent ones of the flat tubes 33. Both edges of the flat tubes 33 may be connected through connection tubes, and the cooling fluid channels 34 of the flat tubes 33 may communicate with each other through the connection tubes.

As two adjacent flat tubes 33 are spaced apart from each other, the exhaust gas channel 23 may be defined between the two adjacent flat tubes 33, and the cooling fluid channels 34 may surround the exhaust gas channel 23.

Figure 2:
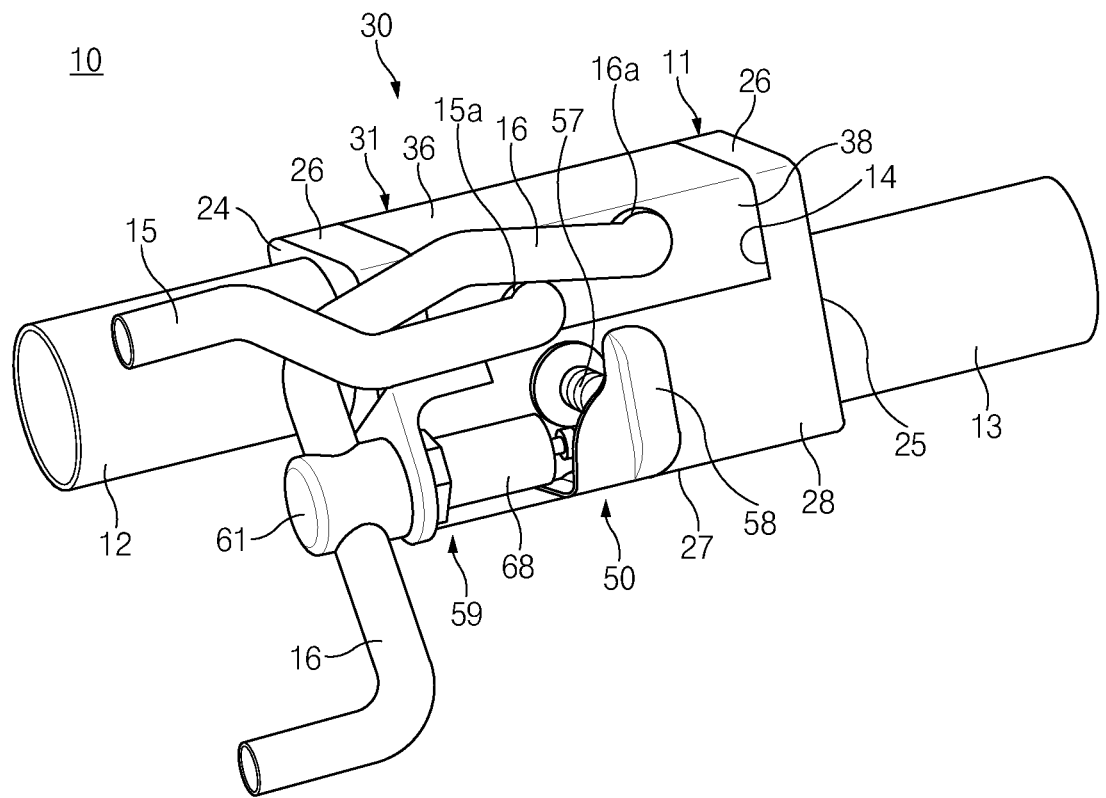
FIG. 2 illustrates a perspective view which is viewed from a direction indicated by arrow A of FIG. 1.

Referring to FIGS. 1 and 2, the housing 11 may have an opening 14 defined in a portion of the top wall 26 and a portion of the pair of sidewalls 28 and 29, and the case 31 of the heat exchanger 30 may be sealingly joined to the opening 14 of the housing 11. As the case 31 of the heat exchanger 30 is fitted into the opening 14 of the housing 11, the tube bundle 32 of the heat exchanger 30 may be located within the first exhaust passage 21.

The case 31 of the heat exchanger 30 may include a top wall 36, a bottom wall 37, and a pair of sidewalls 38 and 39. The top wall 36 of the case 31 may be flush with the top wall 26 of the housing 11, and the bottom wall 37 of the case 31 may face the slide gate 41 and the second exhaust passage 22. The sidewalls 38 and 39 of the case 31 may be flush with the sidewalls 28 and 29 of the housing 11, respectively. Referring to FIG. 5, the bottom wall 37 may have a first opening 37a and a second opening 37b. Referring to FIGS. 3 and 4, the first opening 37a may communicate with the first inlet 21a of the first exhaust passage 21 and the second inlet 22a of the second exhaust passage 22, and the second opening 37b may communicate with the first outlet 21b of the first exhaust passage 21 and the second outlet 22b of the second exhaust passage 22.

Figure 8:
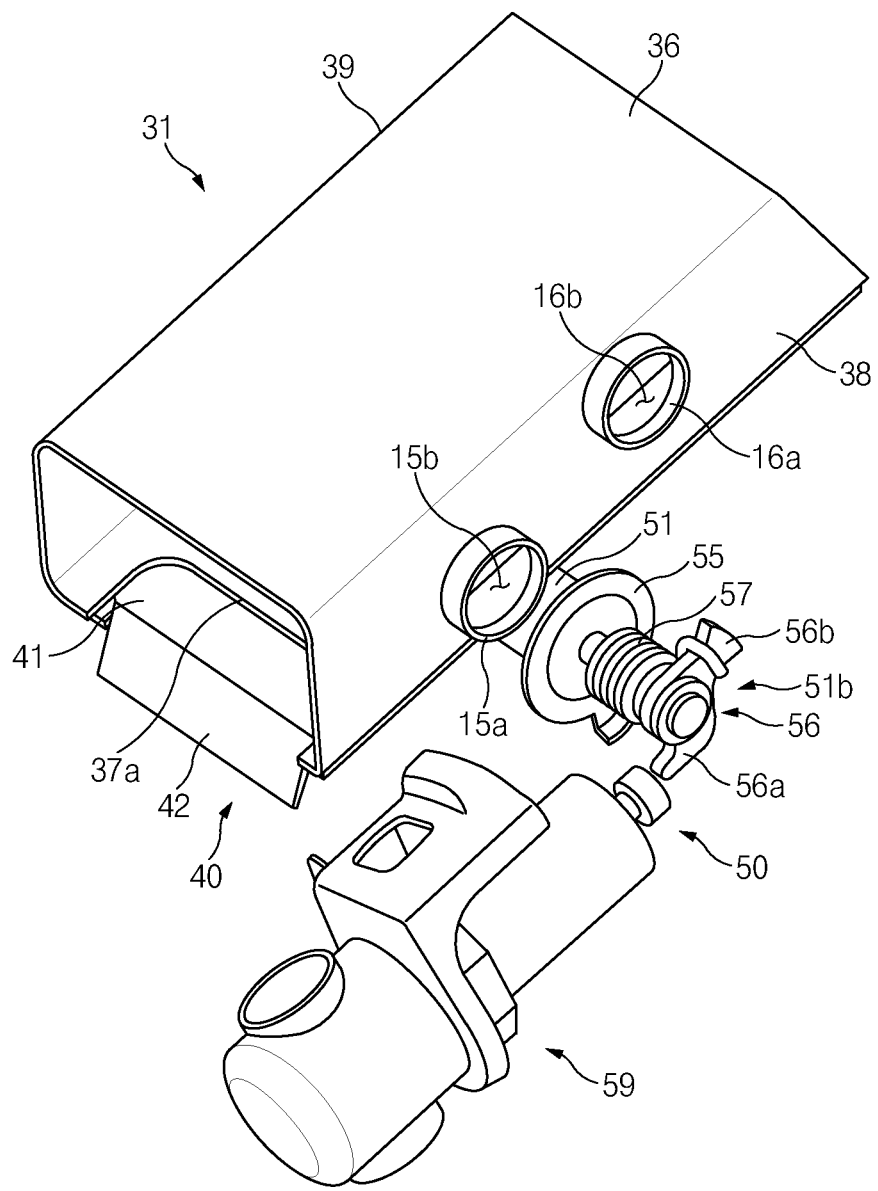
FIG. 8 illustrates a top perspective view of a heat exchanger and a switching valve connected to the heat exchanger in an exhaust heat recovery apparatus according to an exemplary embodiment of the present disclosure.

Referring to FIG. 8, the case 31 may have an inlet boss 15a and an outlet boss 16a. The inlet boss 15a may define an inlet opening 15b communicating with the cooling fluid channel 34 of the tube bundle 32, and the outlet boss 16a may define an outlet opening 16b communicating with the cooling fluid channel 34 of the tube bundle 32. The inlet boss 15a and the outlet boss 16a may be provided on one sidewall 38 of the case 31. Referring to FIG. 2, a cooling fluid inlet fitting 15 and a cooling fluid outlet fitting 16 may be attached to the sidewall 38 of the case 31. The cooling fluid inlet fitting 15 may be sealingly joined to the inlet boss 15a, and the cooling fluid outlet fitting 16 may be sealingly joined to the outlet boss 16a. Thus, the cooling fluid inlet fitting 15 and the cooling fluid outlet fitting 16 may fluidly communicate with the cooling fluid channel 34 of the tube bundle 32. The cooling fluid inlet fitting 15 may allow a cooling fluid (or coolant) to flow into the cooling fluid channel 34 of the tube bundle 32, and the cooling fluid outlet fitting 16 may allow the coolant to be discharged from the cooling fluid channel 34 of the tube bundle 32.

The switching valve 40 may include the slide gate 41 moving between the first exhaust passage 21 and the second exhaust passage 22 along the longitudinal direction of the housing 11, and a drive mechanism 50 driving the slide gate 41.

Referring to FIGS. 3 and 4, the slide gate 41 may linearly move between the first exhaust passage 21 and the second exhaust passage 22 along the longitudinal direction of the housing 11. The slide gate 41 may contact or be adjacent to the bottom wall 37 of the case 31. The slide gate 41 may be disposed to divide the first exhaust passage 21 and the second exhaust passage 22 within the housing 11. In particular, a longitudinal axis of the slide gate 41 may be aligned with the longitudinal direction of the housing 11, and as the slide gate 41 linearly moves in the longitudinal direction of the housing 11, it may selectively block the first inlet 21a of the first exhaust passage 21 and the first outlet 21b of the first exhaust passage 21. The slide gate 41 may include an inlet-side end portion 41a and an outlet-side end portion 41b. As the slide gate 41 moves, the inlet-side end portion 41a may block or connect the first inlet 21a of the first exhaust passage 21 and the second inlet 22a of the second exhaust passage 22, and the outlet-side end portion 41b may block or connect the first outlet 21b of the first exhaust passage 21 and the second outlet 22b of the second exhaust passage 22.

The slide gate 41 may move between a first position (see FIG. 3) and a second position (see FIG. 4).

Referring to FIG. 3, when the slide gate 41 is in the first position, the inlet-side end portion 41a of the slide gate 41 may come into contact with the inlet-side wall 24, and the slide gate 41 may block the second inlet 22a of the second exhaust passage 22. The outlet-side end portion 41b of the slide gate 41 may be spaced apart from the outlet-side wall 25, and the first outlet 21b of the first exhaust passage 21 may fluidly communicate with the second outlet 22b of the second exhaust passage 22. The exhaust gas introduced through the exhaust inlet fitting 12 may pass through the first inlet 21a of the first exhaust passage 21, the exhaust gas channel 23 of the heat exchanger 30, the first outlet 21b of the first exhaust passage 21, and the second outlet 22b of the second exhaust passage 22, and be discharged through the exhaust outlet fitting 13. As the exhaust gas passes through the heat exchanger 30 within the first exhaust passage 21, the exhaust gas may be cooled by the cooling fluid, and the cooling fluid may be heated by the exhaust gas.

Referring to FIG. 4, when the slide gate 41 is in the second position, the inlet-side end portion 41a of the slide gate 41 may be spaced apart from the inlet-side wall 24, and the first inlet 21a of the first exhaust passage 21 may fluidly communicate with the second inlet 22a of the second exhaust passage 22. The outlet-side end portion 41b of the slide gate 41 may come into contact with the outlet-side wall 25, and the outlet-side end portion 41b of the slide gate 41 may block the first outlet 21b of the first exhaust passage 21. The exhaust gas introduced through the exhaust inlet fitting 12 may pass through the first inlet 21a of the first exhaust passage 21, the second inlet 22a of the second exhaust passage 22, the second exhaust passage 22, and the second outlet 22b of the second exhaust passage 22, and be discharged through the exhaust outlet fitting 13. That is, as the slide gate 41 blocks the first outlet 21b of the first exhaust passage 21, the exhaust gas may bypass the tube bundle 32 of the heat exchanger 30, and thus the exhaust gas may not be cooled by the heat exchanger 30.

The case 31 of the heat exchanger 30 may have a pair of guide rails 35 guiding the movement of the slide gate 41, and the guide rails 35 may extend along edges of the bottom wall 37 in a longitudinal direction of the case 31, respectively. The pair of guide rails 35 may be spaced apart from each other in a width direction of the case 31, and edges of the slide gate 41 may be movably received in the corresponding guide rails 35.

The slide gate 41 may have rack teeth 43 arranged in a longitudinal direction of the slide gate 41. The slide gate 41 may have a contact lip 42, and the contact lip 42 may be inclined downwardly toward the inlet-side wall 24. Referring to FIG. 3, when the slide gate 41 moves to the first position, the contact lip 42 of the slide gate 41 may come into contact with the inlet-side wall 24 of the housing 11.

The drive mechanism 50 may include a shaft 51, a driving gear 52 fixed to a middle portion of the shaft 51, a cam member 55 fixed to one end portion of the shaft 51, and a wax actuator 59 rotating the cam member 55.

The shaft 51 may have a first end portion 51a located outward from the housing 11 and a second end portion 51b located within the housing 11. The first end portion 51a may protrude from the case 31 and the housing 11, and the second end portion 51b may be located under the case 31.

The shaft 51 may be adjacent to the slide gate 41. The shaft 51 may be rotatably supported by a shaft support 54, and the shaft support 54 may be fixed to the housing 11 by brackets and/or the like. The shaft 51 may be rotated by the wax actuator 59. Referring to FIGS. 3 and 4, a portion of the shaft 51 including the second portion 51b may be located within the second exhaust passage 22.

The driving gear 52 may be fixed to the middle portion of the shaft 51, and the driving gear 52 may be operatively connected to the slide gate 41 to linearly move the slide gate 41. The driving gear 52 may have teeth 53 arranged on an outer circumferential surface of the driving gear 52. That is, the driving gear 52 may serve as a pinion gear having the teeth 53 arranged in a circumferential direction, and the rack teeth 43 of the slide gate 41 may serve as a rack gear. As the teeth 53 of the driving gear 52 mesh with the rack teeth 43 of the slide gate 41, the teeth 53 of the driving gear 52 and the rack teeth 43 of the slide gate 41 may form a rack and pinion mechanism. Thus, the rotational motion of the driving gear 52 may be converted into the linear motion of the slide gate 41 through the rack and pinion mechanism.

Figure 7:
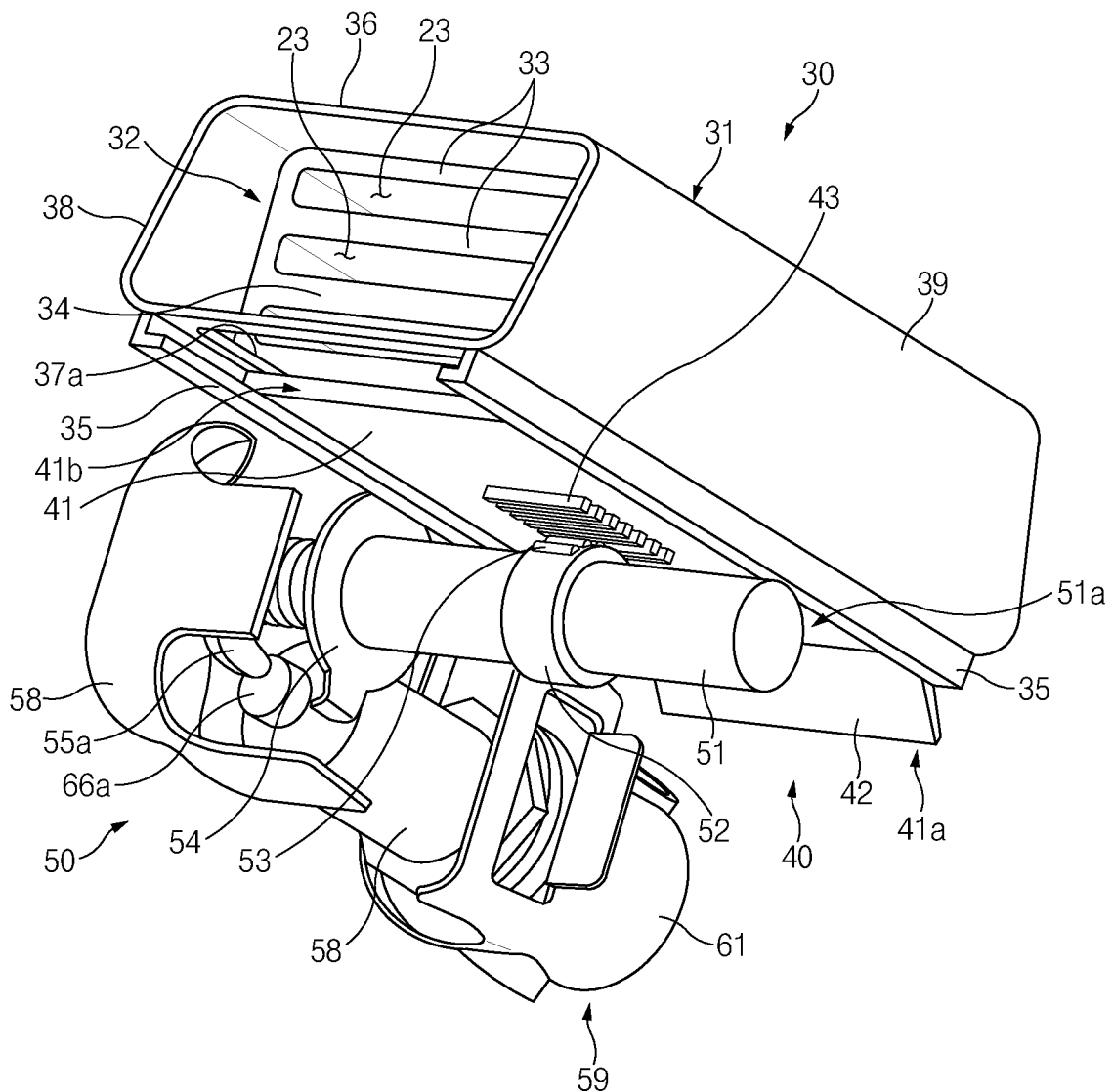
FIG. 7 illustrates a bottom perspective view of a heat exchanger and a switching valve connected to the heat exchanger in an exhaust heat recovery apparatus according to an exemplary embodiment of the present disclosure.

Referring to FIGS. 2 and 7, the cam member 55 may be fixed to the first end portion 51a of the shaft 51 using fasteners and/or the like, and the cam member 55 may be covered with a dust cover 58. The dust cover 58 may protect the cam member 55 from contaminants.

The cam member 55 may have an operating protrusion 55a operatively connected to the wax actuator 59 and a support protrusion 56 opposing the operating protrusion 55a. The operating protrusion 55a may protrude from the cam member 55 toward the wax actuator 59, and the support protrusion 56 may protrude toward the opposite of the wax actuator 59. Thus, the operating protrusion 55a and the support protrusion 56 may protrude oppositely in relation to the cam member 55.

A bias spring 57 may be disposed between the cam member 55 and the shaft support 54, and the bias spring 57 may allow the cam member 55 to be biased toward a predetermined rotation position (that is, a first rotation position to be described below). The bias spring 57 may be a torsion spring disposed around the shaft 51, and the bias spring 57 may have a first leg 57a and a second leg (not shown). The first leg 57a may be supported to the support protrusion 56 of the cam member 55, and the second leg (not shown) may be supported to a support protrusion 54a of the shaft support 54. When a force is not applied to the cam member 55, the bias spring 57 may allow the cam member 55 to be biased toward the predetermined rotation position by a biasing force.

Figure 9:
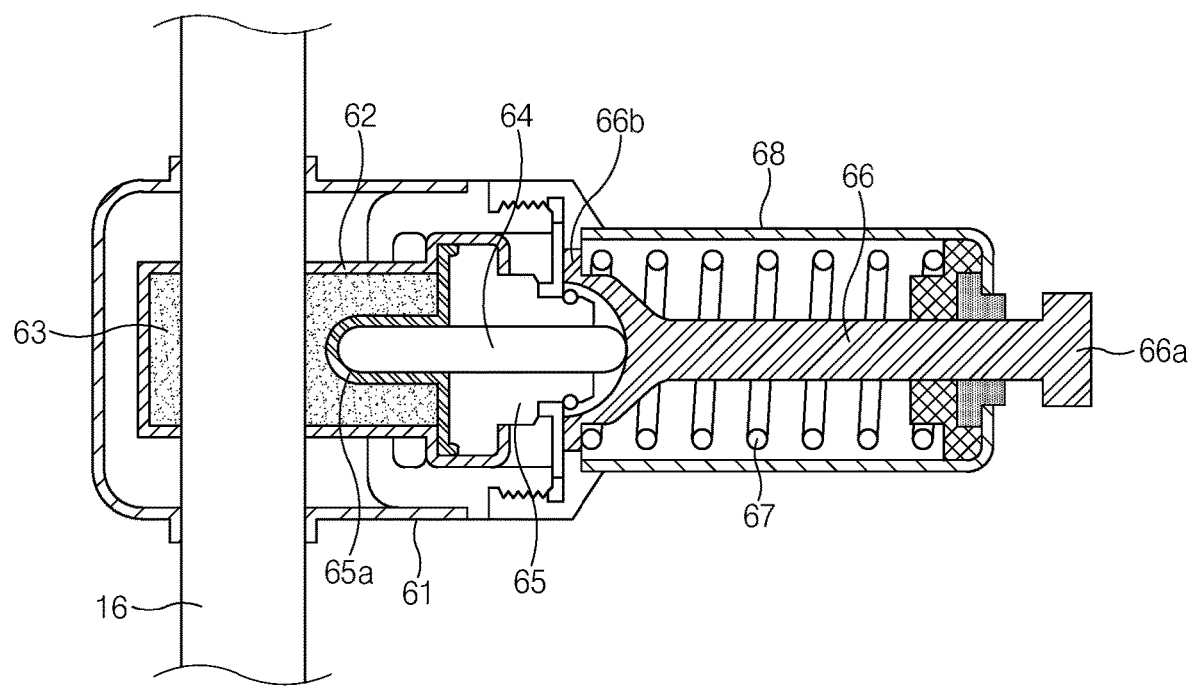
FIG. 9 illustrates a cross-sectional view of a wax actuator of a drive mechanism in an exhaust heat recovery apparatus according to an exemplary embodiment of the present disclosure.
Figure 10:
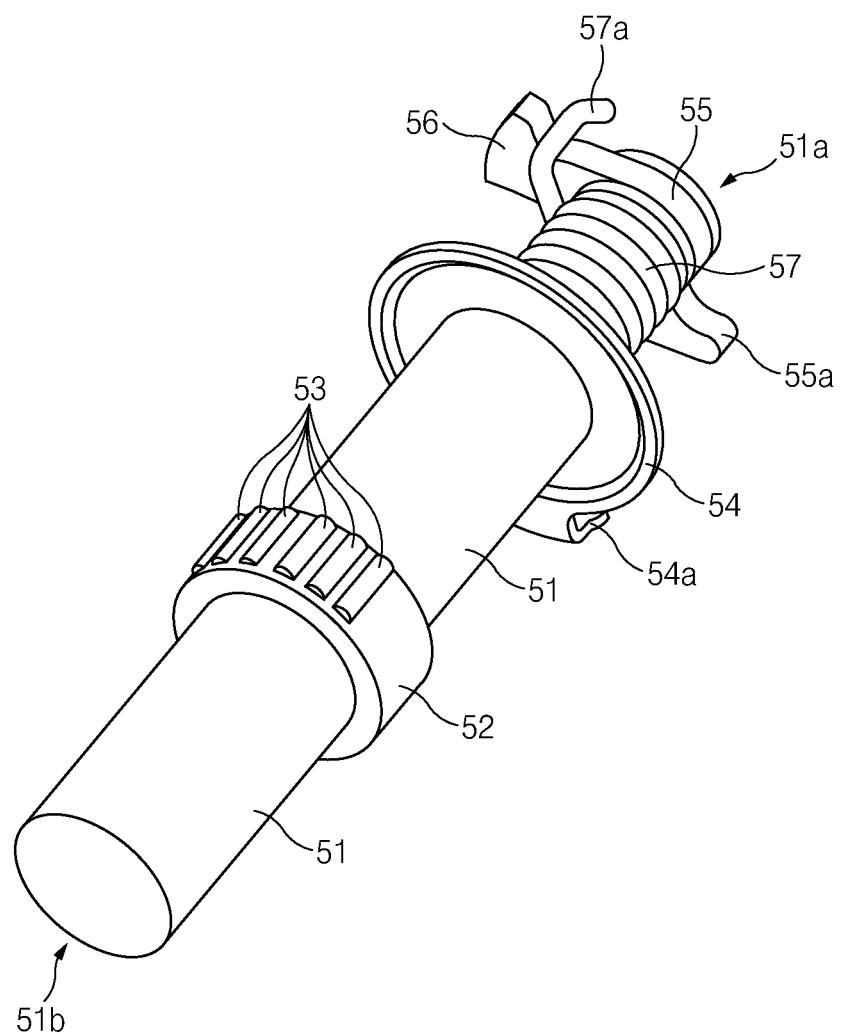
FIG. 10 illustrates a perspective view of a shaft, a driving gear, and a cam member of a drive mechanism in an exhaust heat recovery apparatus according to an exemplary embodiment of the present disclosure.

Referring to FIG. 9, the wax actuator 59 may include an outer housing 61, an inner housing 62 disposed inside the outer housing 61, and a cap 68 attached to the outer housing 61.

The outer housing 61 may have a cup shape having an opening defined at one end of the outer housing 61, and the outer housing 61 may surround at least a portion of the inner housing 62.

The inner housing 62 may be made of a thermally conductive material, and the inner housing 62 may have an opening defined at one end of the inner housing 62. An inner rod 64 and a guide member 65 may be sealingly mounted in the opening of the inner housing 62. The inner rod 64 may advance and retract by the expansion and contraction of a wax material 63, and the guide member 65 may guide the advance and retraction of the inner rod 64. The inner rod 64 may have a first end portion protruding from the guide member 65, and a second end portion close to the wax material 63. A sealing bag 65a may be sealingly fixed to the guide member 65, and the sealing bag 65a may be inserted into the inner housing 62.

The cap 68 may be sealingly mounted in the opening of the outer housing 61 through a sealing material, a gasket, and/or the like. The cap 68 may extend from the outer housing 61 toward the shaft 51 and the cam member 55. An operating rod 66 may be disposed to advance and retract with respect to the cap 68, and the operating rod 66 may include a first head 66a facing the operating protrusion 55a of the cam member 55 and a second head 66b facing the inner housing 62. The first head 66a may extend from one end of the operating rod 66 in an outer diameter direction of the operating rod, and the second head 66b may extend from the other end of the operating rod 66 in the outer diameter direction of the operating rod. A diameter of the first head 66a and a diameter of the second head 66b may be greater than a diameter of the operating rod 66.

The first head 66a may push the operating protrusion 55a of the cam member 55 by the expansion of the wax material 63, and thus the cam member 55 may move toward a second rotation position. The second head 66b may have a concave recess contacting the first end portion of the inner rod 64.

A coil spring 67 may be mounted inside the cap 68, and the coil spring 67 may allow the operating rod 66 to be biased toward the inner housing 62. That is, the coil spring 67 may restore the operating rod 66 to its original position (i.e., retraction position) upon the contraction of the wax material. The coil spring 67 may be disposed around the operating rod 66. A first end portion of the coil spring 67 may be supported to the cap 68, and a second end portion of the coil spring 67 may be supported to the second head 66b.

The wax actuator 59 may be thermally connected to the cooling fluid outlet fitting 16, and thus the wax material 63 of the wax actuator 59 may expand or contract depending on a temperature of the cooling fluid passing through the cooling fluid outlet fitting 16. Referring to FIGS. 2 and 9, the cooling fluid outlet fitting 16 may extend through the outer housing 61 and the inner housing 62 of the wax actuator 59, and the inner housing 62 may be made of the thermally conductive material, and thus the inner housing 62 may transfer the heat of the cooling fluid passing through the cooling fluid outlet fitting 16 to the wax material 63. When the temperature of the cooling fluid heated by the heat exchanger 30 is greater than or equal to a predetermined reference temperature, the wax material 63 may expand, and accordingly the operating rod 66 may advance toward the cam member 55, and the operating rod 66 may push the operating protrusion 55a of the cam member 55. The wax material 63 may expand when the temperature of the cooling fluid heated by the heat exchanger 30 is greater than or equal to the predetermined reference temperature, and may contract when the temperature of the cooling fluid heated by the heat exchanger 30 is lower than the predetermined reference temperature.

The wax material 63 of the wax actuator 59 may detect whether the temperature of the cooling fluid heated by the heat exchanger 30 is greater than or equal to the predetermined reference temperature. When the temperature of the cooling fluid heated by the heat exchanger 30 is greater than or equal to the predetermined reference temperature, the inner rod 64 and the operating rod 66 may advance toward the cam member 55 by the expansion of the wax material 63. The reference temperature may be a temperature for determining the degree of overheating of the cooling fluid. For example, the reference temperature may be 70° C.

The cam member 55 may rotate between the first rotation position (see FIG. 11) in which the slide gate 41 is moved to the first position and the second rotation position (see FIG. 12) in which the slide gate 41 is moved to the second position.

Figure 11:
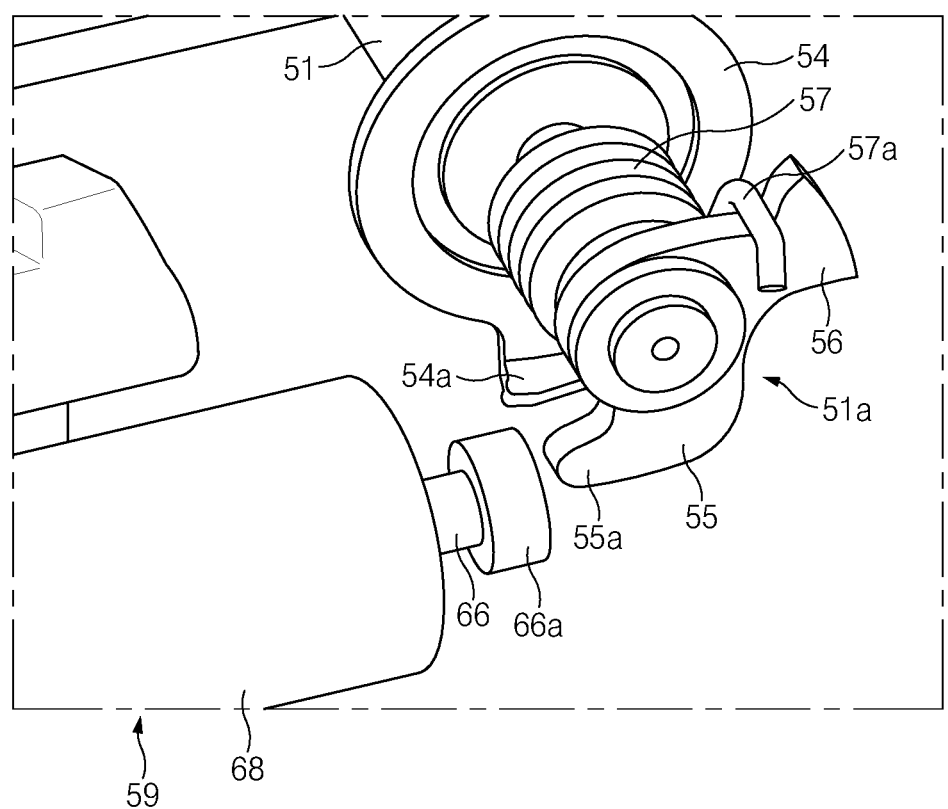
FIG. 11 illustrates a state in which a cam member is moved to a first rotation position by a bias spring in an exhaust heat recovery apparatus according to an exemplary embodiment of the present disclosure.

Referring to FIG. 11, the cam member 55 may be biased to the first rotation position by the biasing force of the bias spring 57. When the cam member 55 is in the first rotation position, the slide gate 41 may be maintained in the first position (see FIG. 3) by the teeth 53 of the driving gear 52 and the rack teeth 43 of the slide gate 41. As illustrated in FIG. 3, when the slide gate 41 is in the first position, the exhaust gas may flow into the first exhaust passage 21, and when the exhaust gas passes through the exhaust gas channel 23 of the heat exchanger 30, the exhaust gas may heat the cooling fluid flowing through the cooling fluid channel 34, and the cooling fluid may cool the exhaust gas.

Figure 12:
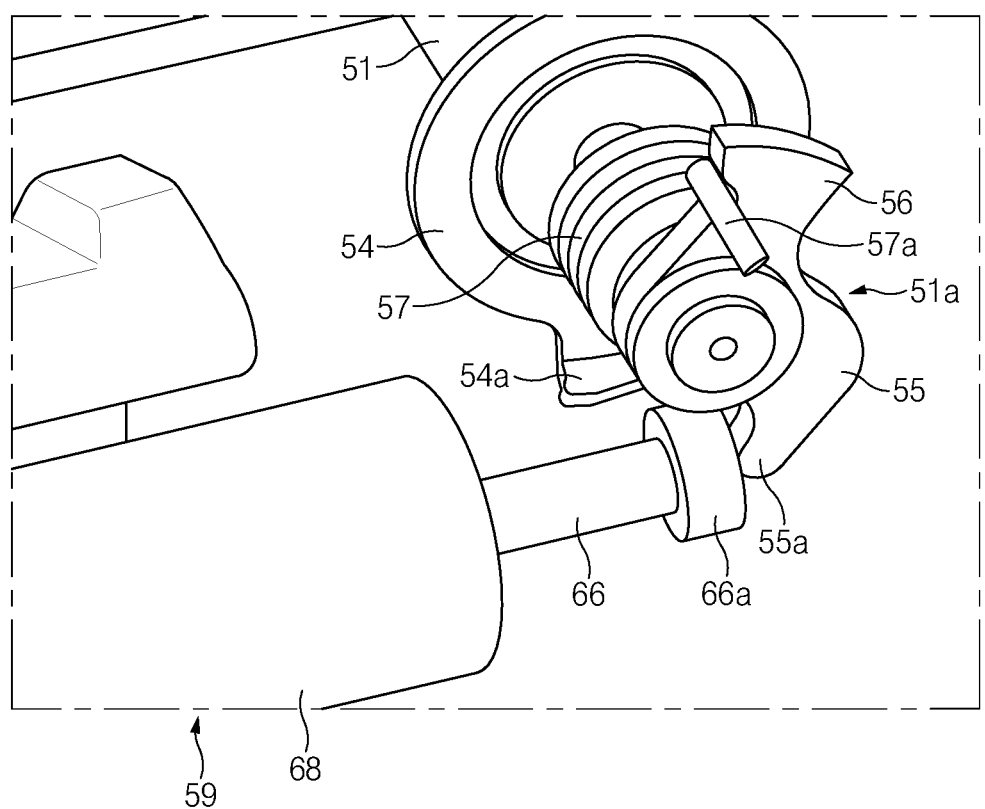
FIG. 12 illustrates a state in which a cam member is moved to a second rotation position by a wax actuator in an exhaust heat recovery apparatus according to an exemplary embodiment of the present disclosure.

Meanwhile, when the cooling fluid is excessively heated, the excessively heated cooling fluid may cause heat damage to a system using the cooling fluid. When the temperature of the cooling fluid heated by the heat exchanger 30 is greater than or equal to the predetermined reference temperature, the inner rod 64 and the operating rod 66 of the wax actuator 59 may advance toward the cam member 55 by the expansion of the wax material 63, and the coil spring 67 may be compressed, as illustrated in FIG. 12. As the first head 66a of the advancing operating rod 66 pushes the operating protrusion 55a of the cam member 55, the cam member 55 may rotate toward the second rotation position. When the cam member 55 is in the second rotation position, the slide gate 41 may be maintained in the second position (see FIG. 4) by the teeth 53 of the driving gear 52 and the rack teeth 43 of the slide gate 41. As illustrated in FIG. 4, when the slide gate 41 is in the second position, the exhaust gas may flow into the second exhaust passage 22. As the exhaust gas bypasses the heat exchanger 30, heat exchange (i.e., heat transfer) may not occur between the cooling fluid and the exhaust gas.

As set forth above, according to exemplary embodiments of the present disclosure, the exhaust heat recovery apparatus may be configured to switch a flow of the exhaust gas between the first exhaust passage and the second exhaust passage by movement of the slide gate, thereby reducing the volume and weight thereof, and thus ease of assembly (i.e., mounting) of the exhaust heat recovery apparatus may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An exhaust heat recovery apparatus, comprising:
a housing having a first exhaust passage and a second exhaust passage, an exhaust inlet fitting, and an exhaust outlet fitting;
a heat exchanger disposed in the first exhaust passage; and
a switching valve having a slide gate which is movable in a longitudinal direction of the housing so as to allow a flow of exhaust gases to be switched between the first exhaust passage and the second exhaust passage,
wherein the first exhaust passage is parallel to the second exhaust passage, and wherein the slide gate is movable between the first exhaust passage and the second exhaust passage, wherein the slide gate is solely configured to separate the first exhaust passage and the second exhaust passage within the housing.

2. The exhaust heat recovery apparatus according to claim 1, wherein the first exhaust passage has a first inlet communicating with the exhaust inlet fitting, and a first outlet communicating with the exhaust outlet fitting, and the second exhaust passage has a second inlet communicating with the exhaust inlet fitting and a second outlet communicating with the exhaust outlet fitting.

3. The exhaust heat recovery apparatus according to claim 2, wherein the first inlet directly communicates with the exhaust inlet fitting, the second inlet selectively communicates with the first inlet by movement of the slide gate, the second outlet directly communicates with the exhaust outlet fitting, and the first outlet selectively communicates with the second outlet by the movement of the slide gate.

4. The exhaust heat recovery apparatus according to claim 3, wherein the slide gate moves between a first position and a second position, the first position refers to a position in which the slide gate blocks the second inlet, and the second position refers to a position in which the slide gate blocks the first outlet.

5. The exhaust heat recovery apparatus according to claim 1, wherein the heat exchanger includes a tube bundle having a plurality of flat tubes, and the tube bundle includes a cooling fluid channel defined inside each of the flat tubes, and an exhaust gas channel defined between adjacent ones of the flat tubes.

6. The exhaust heat recovery apparatus according to claim 5, wherein the heat exchanger has a cooling fluid inlet fitting and a cooling fluid outlet fitting communicating with the cooling fluid channel.

7. The exhaust heat recovery apparatus according to claim 6, wherein the switching valve includes a drive mechanism by which the slide gate is driven, the drive mechanism includes a shaft, a driving gear fixed to the shaft, a cam member fixed to an end portion of the shaft, and a wax actuator selectively rotating the cam member, and the driving gear is operatively connected to the slide gate to linearly move the slide gate.

8. The exhaust heat recovery apparatus according to claim 7, wherein the driving gear has teeth arranged on an outer circumferential surface of the driving gear, the slide gate has rack teeth arranged in a longitudinal direction of the slide gate, and the teeth of the driving gear mesh with the rack teeth of the slide gate.

9. The exhaust heat recovery apparatus according to claim 7, wherein the cam member rotates between a first rotation position in which the slide gate is moved to a first position and a second rotation position in which the slide gate is moved to a second position.

10. The exhaust heat recovery apparatus according to claim 7, wherein the wax actuator is thermally connected to the cooling fluid outlet fitting, and the wax actuator includes a wax material which expands or contracts depending on a temperature of a cooling fluid passing through the cooling fluid outlet fitting, and an operating rod which advances and retracts by expansion and contraction of the wax material.

* * * * *